United States Patent
Kaneko et al.

(10) Patent No.: US 6,512,542 B1
(45) Date of Patent: Jan. 28, 2003

(54) TV LENS DRIVE UNIT HAVING A MECHANISM FOR DESIGNATING A CONSTANT ZOOM RATE

(75) Inventors: Keiji Kaneko, Saitama (JP); Hisao Takemae, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/161,437

(22) Filed: Sep. 28, 1998

(30) Foreign Application Priority Data

Sep. 29, 1997 (JP) .............................................. 9-264078

(51) Int. Cl.$^7$ .......................... G03B 13/00; H04N 5/262

(52) U.S. Cl. ...................... 348/240.3; 348/347; 396/76; 396/86

(58) Field of Search ................................ 348/207, 222, 348/345, 347, 349–351, 354–358, 360, 222.1, 240.99, 240.1, 240.3; 396/72, 76, 85, 86, 87; H04N 5/262; G03B 13/00

(56) References Cited

U.S. PATENT DOCUMENTS

| | | | | |
|---|---|---|---|---|
| 5,140,357 A | * | 8/1992 | Suda | 348/347 |
| 5,305,038 A | * | 4/1994 | Mogamiya | 396/83 |
| 5,438,190 A | * | 8/1995 | Kaneda | 250/201.3 |
| 5,570,236 A | * | 10/1996 | Hirasawa | 348/345 |
| 5,893,651 A | * | 4/1999 | Sakamoto | 348/357 |
| 6,035,137 A | | 3/2000 | Kaneko et al. | 396/76 |
| 6,292,313 B1 | * | 9/2001 | Kanayama | 359/823 |

* cited by examiner

Primary Examiner—Ngoc-Yen Vu
(74) Attorney, Agent, or Firm—Birch, Stewart, Kolasch & Birch, LLP

(57) ABSTRACT

When a constant rate switch is pressed during the operation of a seesaw switch, an output voltage of a potentiometer in the seesaw switch is stored in a condenser and a command from the seesaw switch is invalidated. The output voltage of the potentiometer when the constant switch is operated is input to an operational amplifier, and a zoom drive motor is run at a constant rate to maintain the zoom rate which has been controlled by the seesaw switch. There may be provided a function which reduces the rate in proximity to the telephoto end or the wide end, and the constant switch may also serve as another switch means such as a return switch.

9 Claims, 9 Drawing Sheets

F I G. 1
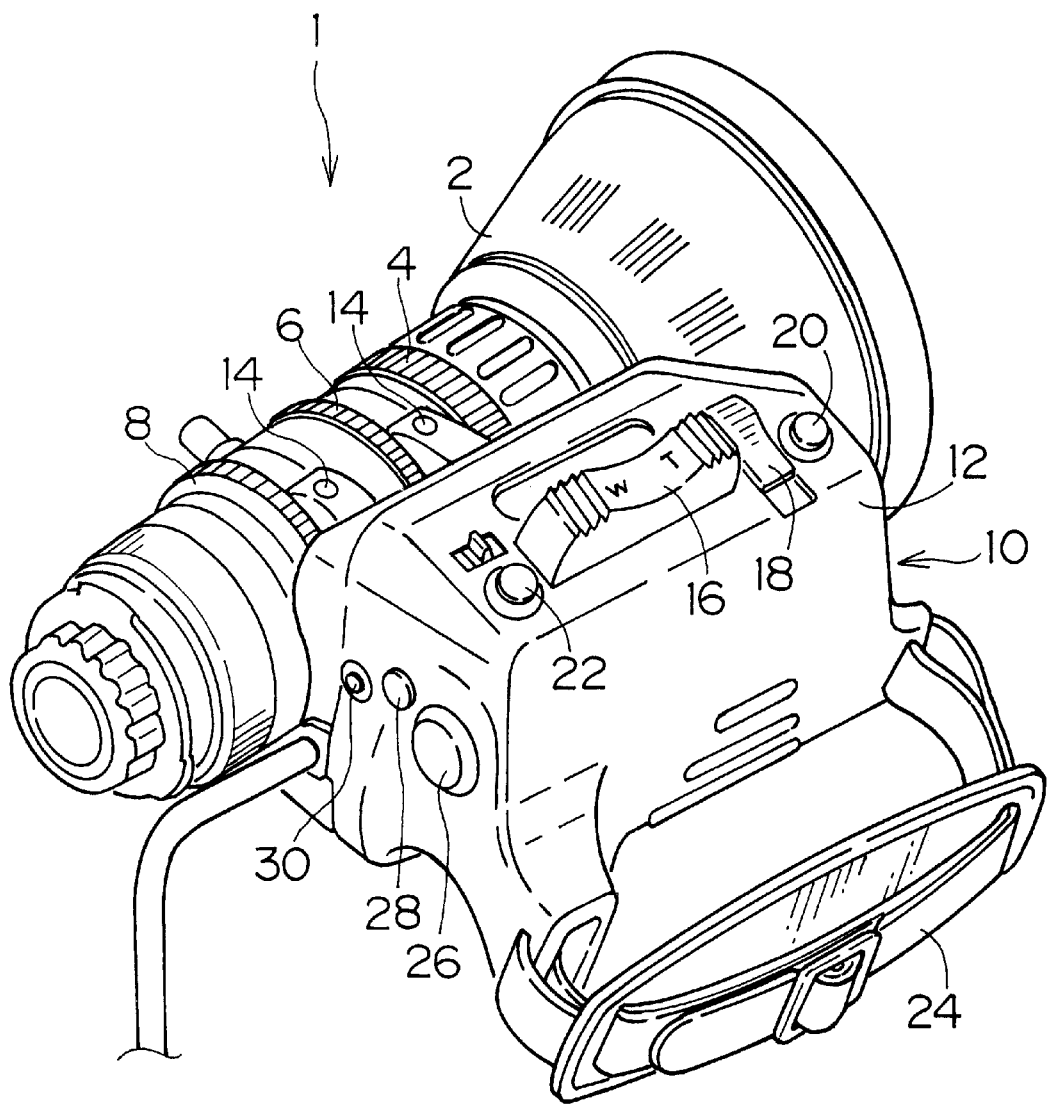

F I G. 3
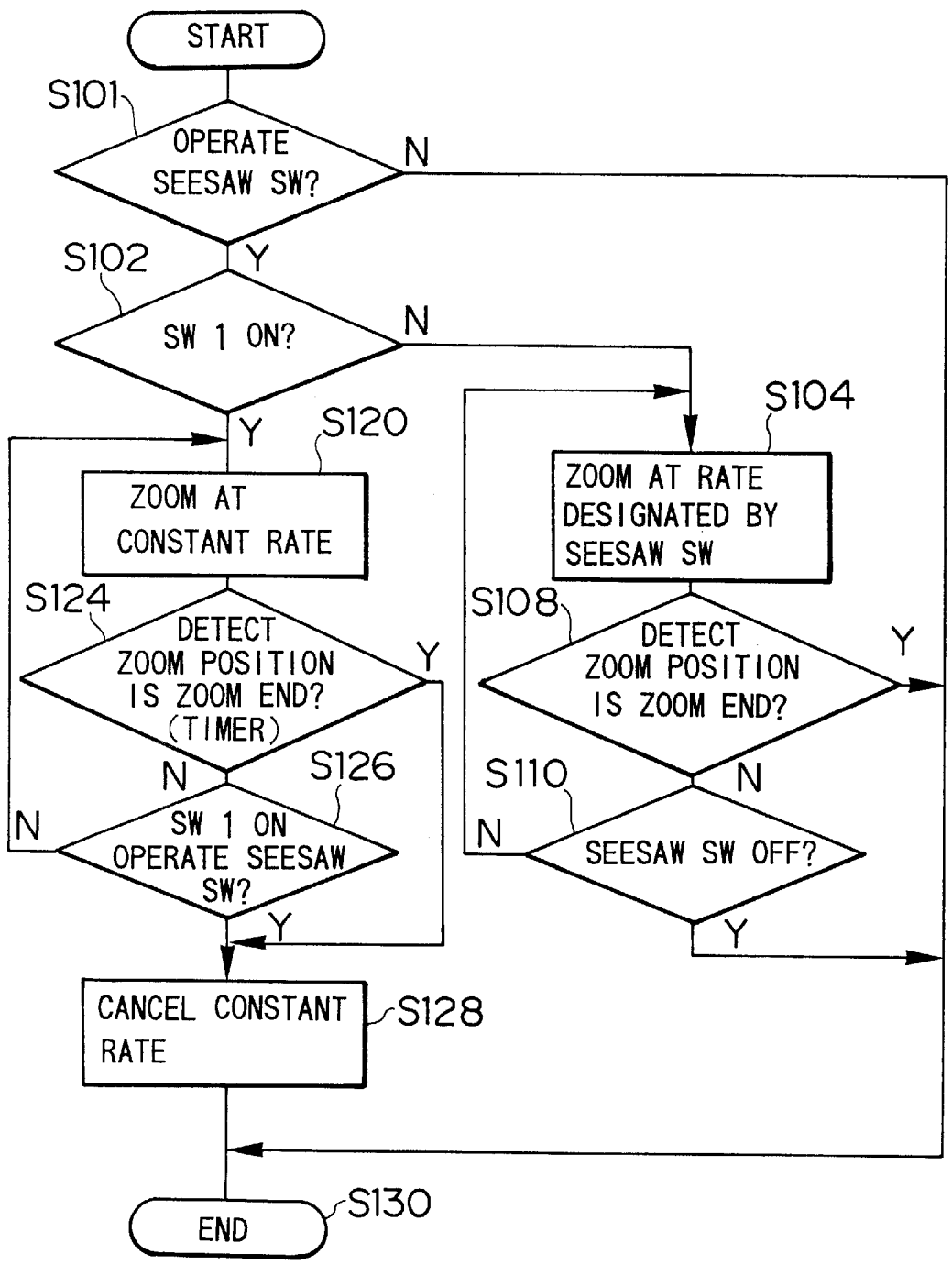

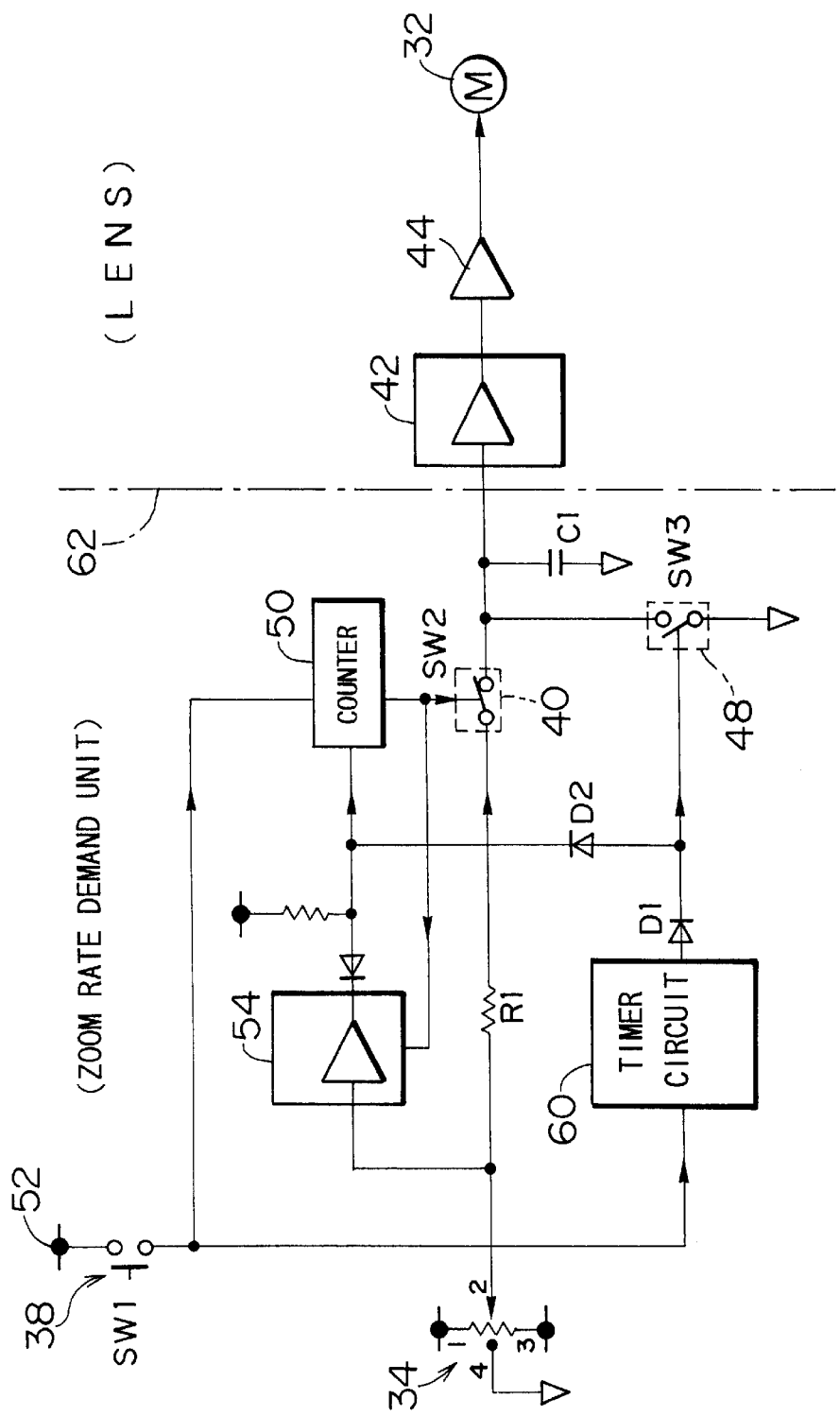
F I G. 6

TV LENS DRIVE UNIT HAVING A MECHANISM FOR DESIGNATING A CONSTANT ZOOM RATE

BACKGROUND OF THE INVENTION

1. Field of the Invention

The present invention relates generally to a TV lens drive unit, and more particularly to a TV lens drive unit which controls the zooming of a zoom lens used in an ENG camera, etc.

2. Description of Related Art

In an ENG lens used for a broadcast camera, etc., a lens drive unit is attached to the side of a lens barrel, and a rotational driving force of a motor, which is arranged in the drive unit, drives a focus ring, a zoom ring, and an iris ring in the lens barrel to adjust a zoom, a focus and an iris, respectively.

The lens drive unit performs the zooming with a zoom seesaw control switch (hereinafter referred to as a seesaw switch) and a zoom rate demand unit. The zoom rate can be adjusted in accordance with the operated amount of the seesaw switch and a thumb ring of the zoom rate demand unit.

To control the zooming at a constant rate, however, it is necessary to keep the depth (the operated amount) of the seesaw switch or the thumb ring constant with fingers. While a cameraman is shooting with an ENG camera on the shoulder, it is difficult to control the zooming at a constant rate. In particular, the pressed amount of the seesaw switch, etc. must be kept constant for a long period of time in order to maintain the slow rate, and such an operation is difficult.

SUMMARY OF THE INVENTION

The present invention has been developed in view of the above-described circumstances, and has as its object the provision of a TV lens drive unit which is able to control the zooming at a constant rate by a simple operation and reduce the difficulties during the operation.

To achieve the above-described objects, a TV lens drive unit which moves a variable frame lens group of a TV lens with a motor to thereby adjust a zoom, the TV lens drive unit comprising: zoom control means for designating a telephoto/wide zoom direction and a zoom rate; storage means for storing the zoom direction and the zoom rate, designated by the zoom control means when switch means is operated, in response to the operation of the switch means during the operation of the zoom control means; and motor control means for invalidating the zoom direction and the zoom rate designated by the zoom control means in response to the operation of the switch means during the operation of the zoom control means, and running the motor so that the zoom rate can be constant in accordance with the designation of the zoom direction and the zoom rate stored in the storage means.

According to the present invention, if the switch means is operated when the zoom control means control the zooming by designating the zoom direction and zoom rate, the designated zoom direction and zoom rate when the switch means is operated are stored in the storage means. Then, a command from the zoom control means is invalidated, and the zooming continues at the stored zoom rate in the stored direction. It is therefore possible to easily maintain the zoom rate constant by operating switch means during the operation of the zoom control means.

Moreover, the above-described TV lens drive unit is provided with a detection means which detects that the zoom position is close to the telephoto end or the wide end, and a reducing means which reduces the zoom rate in proximity to the telephoto end or the wide end in accordance with the detection of the detection means. It is therefore possible to prevent a sudden stop at the telephoto end or the wide end, and the lens can stop naturally at the zoom end.

Furthermore, the control member of the switch means may also serve as a control member of a switch means relating to another function such as a return switch.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating the appearance of the TV lens to which the present invention is applied;

FIG. 3 is a flow chart showing the flow of zooming;

FIG. 6 is a circuit diagram showing another example of the structure when the TV lens drive unit according to the present invention is applied to a zoom rate demand unit;

DETAILED DESCRIPTION OF THE PREFERRED EMBODIMENT

Figure 2:
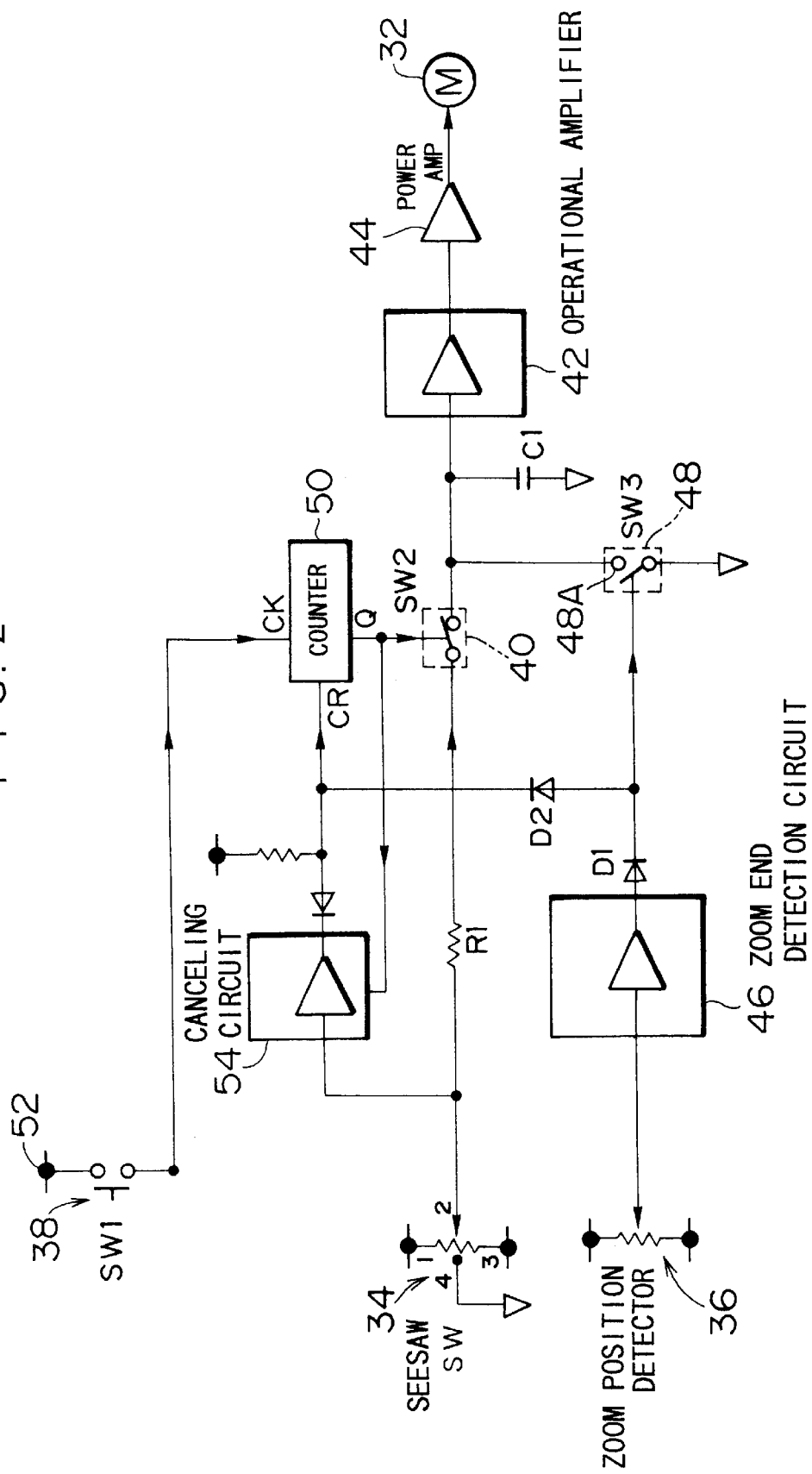
FIG. 2 is a circuit diagram showing an example of the TV lens drive unit.

This invention will be described in further detail by way of example with reference to the accompanying drawings.

FIG. 1 is a perspective view illustrating the appearance of a TV lens to which the present invention is applied. The TV lens 1 is a zoom lens for use in an ENG camera, etc. A focus ring 4, a zoom ring 6 and an iris ring 8 are formed in a lens barrel 2. A drive unit 10 is attached to the side of the lens barrel 2, and the drive unit 10 drives the focus ring 4, the zoom ring 6 and the iris ring 8.

The inner structure of the lens barrel 2 is not illustrated, but as is well known, a focus lens group, a variable frame lens group, an iris, a relay lens, etc. are arranged in the lens barrel. Rotating the focus ring 4 moves the focus lens group forward and backward along an optical axis to adjust a focus. Rotating the zoom ring 6 moves the variable frame lens group forward and backward along the optical axis to adjust a zoom. Rotating the iris ring 8 adjusts the diameter of an iris diaphragm.

The drive unit 10 has a case 12, which is fixed to the side of the lens barrel 2 with screws 14, 14. A focus drive motor (not illustrated) is arranged in the case 12, and the rotational driving force of the focus drive motor is transmitted to the focus ring 4 through a gear transmission mechanism (not illustrated) to rotate the focus ring 4. A zoom drive motor (not illustrated in FIG. 1) is arranged in the case 12, and the rotational driving force of the zoom drive motor is transmitted to the zoom ring 6 through a gear transmission mechanism (not illustrated) to rotate the zoom ring 6. Likewise, an iris drive motor (not illustrated) is arranged in the case 12 to rotate the iris ring 8.

A zoom seesaw control switch (a seesaw switch) 16, an iris auto/manual mode changeover switch 18, an iris momentary switch 20, a return switch 22, etc. are provided at the top of the case 12.

The seesaw switch 16 is capable of swinging with the neutral position being the basis. If the seesaw switch 16 is operated to a telephoto (T) side or a wide (W) side, the zoom ring 6 is rotated to the telephoto side or the wide side. The pressed amount (the operated amount) of the seesaw switch 16 adjusts the zoom rate. The larger the pressed amount is, the higher the zoom rate is.

A grip band 24 is attached to the side of the case 12, and the cameraman inserts four fingers (other than the thumb) of the right hand into the grip band 24 to hold the lens barrel 2. A VTR switch 26 and a constant zoom rate control start switch (hereinafter referred to as a constant switch) 28 are arranged on the back surface of the case 12 (see FIG. 2), and the cameraman can operate the switches 26, 28 with the thumb of the right hand.

The VTR switch 26 is a push button which is operated to start and finish recording when an image being captured is recorded on video tape. The constant rate switch 28 is also a push button. Pressing the constant rate switch 28 during the operation of the seesaw switch 16 keeps a zoom rate constant. The zoom rate is indicated by the operated amount of the seesaw switch 16 when the constant switch 28 is operated.

Reference numeral 30 is a maximum zoom rate control, and rotating the control 30 sets the zoom rate (the maximum zoom rate). When the seesaw switch 16 is pressed the deepest, the zooming is performed at the maximum zoom rate. For example, the more the maximum zoom rate control 30 is rotated clockwise in the drawing, the higher the maximum zoom rate is. The more the maximum zoom rate control 30 is rotated counterclockwise, the lower the maximum zoom rate is.

FIG. 2 shows an example of the circuit in the drive unit for the TV lens 1. In FIG. 2, reference numeral 32 is a zoom drive motor, 34 is a potentiometer corresponding to the seesaw switch 16 in FIG. 1, 36 is a potentiometer which is equivalent to a zoom position detector for detecting the position of the variable frame lens group (a zoom position), 38 is a switch means (hereinafter referred to as a switch SW1) which is equivalent to the constant rate switch 28 in FIG. 1.

The output of the potentiometer 34 in the seesaw switch 16 is transmitted to an input terminal of an operational amplifier 42 via a resistance R1 and a relay 40 (hereinafter referred to as a switch SW2). The operational amplifier 42, which is simplified in the drawing, generates a motor drive signal which realizes a zoom rate conforming to the operated amount of the seesaw switch 16 in accordance with the maximum rate set by the maximum zoom rate control 30. The motor drive signal is added to the zoom drive motor 32 through a power amplifier 44.

When the seesaw switch 16 is operated, the zooming is performed at the zoom rate conforming to the operated amount of the seesaw switch 16 with the set maximum rate being the upper limit.

The input terminal of the operational amplifier 42 connects to one terminal of the condenser C1, and a common voltage terminal connects to the other terminal of the condenser C1. While the switch SW2 (a contact of a normally closed circuit) is ON, an output voltage (a zoom rate designation voltage) of the potentiometer 34 is charged in the condenser C1. As will be described in further detail, pressing (ON) the switch SW1 turns off the switch SW2 to store the zoom rate designation voltage in the condenser C1. When the switch SW1 is pressed, the potentiometer 34 outputs the zoom rate designation voltage. Consequently, the zoom rate designation voltage when the switch SW1 is turned on is input to the operational amplifier 42, keeping the zoom rate constant.

A potentiometer 36 regularly detects the zoom position, and an output signal (a zoom position detection signal) of the potentiometer 36 is transmitted to a zoom end detection circuit 46, which is simplified in the drawing. The zoom end detection circuit 46 detects whether the taking lens has reached the telephoto or wide end (hereinafter referred to as the zoom end) or not, and outputs a signal in accordance with the detection results.

The output signal of the zoom end detection circuit 46 is transmitted to a relay 48 (hereinafter referred to as a switch SW3) through a diode D1 to open and close a contact of the switch SW3 (a contact of the normally open circuit).

One terminal 48A of the switch SW3 as well as the terminal of the condenser C1 connects to an input terminal of the operational amplifier 42, and the other terminal of the switch SW3 connects to a common voltage terminal. When the zoom end detection circuit 46 outputs a detection circuit indicating that it has detected the zoom end, the switch SW3 is turned on and the operational amplifier 42 outputs a motor stop signal to stop the zoom drive motor 32.

The output signal of the zoom end detection circuit 46 is transmitted to a clear terminal (CR) of an input-output circuit (e.g., an up counter) 50. An input terminal (CK) of the input-output circuit 50 connects to a voltage terminal 52 via the switch SW1, and an output signal of the input-output circuit 50 is transmitted to the switch SW2 and a canceling circuit 54. The input-output circuit 50 outputs a signal from an output terminal (Q) thereof to turn off the contact of the switch SW2 when a pulse is input from the input terminal (CK).

The cancel circuit 54, which is simplified in the drawing, detects the change in the output of the potentiometer 34 in the seesaw switch 16 to supply a reset signal to the input-output circuit 50. When the seesaw switch 16 is operated, the switch SW2 is closed to cancel the zooming at the constant rate (the constant rate zooming).

A description will be given of the operation of the TV lens drive unit which is constructed in the above-mentioned manner.

In the normal state (not operated), the switch SW1 in FIG. 2 is OFF, the switch SW2 is ON, and the switch SW3 is OFF. If the seesaw switch 16 is operated in the normal state, the output of the potentiometer 34 in accordance with the operation is transmitted to the operational amplifier 42 to run the zoom drive motor 32. Specifically, the zooming is performed at the zoom rate conforming to the pressed amount of the seesaw switch 16 with the maximum rate set by the maximum zoom rate control 34 being the upper limit.

During that time, the potentiometer 36 regularly monitors the zoom position. When the zoom end detection circuit 46 detects the zoom end, the switch SW3 is turned on to invalidate the instruction from the seesaw switch 16. Then, the operational amplifier 42 outputs a motor stop signal to stop the zoom drive motor 32.

If the constant rate switch 28 (switch SW1) is pressed (ON) before the zoom end is detected during the operation of the seesaw switch 16, the switch SW2 is turned off and the output voltage of the potentiometer 34 is stored in the condenser C1. Even if a finger is removed from the seesaw switch 16 to return it to the neutral, the zooming continues at the rate (constant rate) which has been controlled by the seesaw switch 16.

The constant rate action is cancelled in the following three cases. The first case is that the zoom end detection circuit 46 detects the zoom end, the second case is that the seesaw switch 16 is operated again during the constant rate zooming, and the third case is that the switch SW1 is pressed again during the constant rate zooming.

If the zoom end detection circuit 46 detects the zoom end during the constant rate zooming, the zoom end detection circuit 46 outputs a detection signal to turn on the switch SW3. At this time, the operational amplifier 42 outputs the motor stop signal to stop the zoom drive motor 32.

If the seesaw switch 16 is operated again during the constant rate action, the cancel circuit 54 detects the change in the output of the potentiometer 34 due to the operation. The cancel circuit 54 outputs a reset signal to the input-output circuit 50. On reception of the reset signal, the switch SW2 outputs a signal to turn on the switch SW2. This causes the output voltage of the potentiometer 34 in the seesaw switch 16 to transmit to the operational amplifier 42. The zooming is performed at the rate conforming to the operation of the seesaw switch 16.

If the constant rate switch 28 is pressed again during the constant rate zooming which was started by pressing the constant rate switch 28, the input-output circuit 50 outputs a signal to turn on the switch SW2 to cancel the constant rate zooming.

A description will be given of the flow of the zooming with reference to the flow chart of FIG. 3.

In the zoom control, the operation is specified by whether the seesaw switch 16 is operated or not (step S101), and whether the constant rate switch 28 (the switch SW1) is operated or not (step S102).

Specifically, if the switch SW1 is not turned on after the seesaw switch 16 is operated (step S101), the zooming is performed at a rate conforming to the operation of the seesaw switch 16 (step S104). The zooming continues in accordance with the operation of the seesaw switch 16 (steps S104–S110) until the zoom end is detected (step S108) or until the operation of the seesaw switch 16 is cancelled (step S110).

If the zoom end is detected at the step S108 or if the operation of the seesaw switch 16 is cancelled at the step S110, the zooming is completed (step S130).

On the other hand, if the switch SW1 is turned on (step S102) after the seesaw switch 16 is operated (step S101), the zooming is performed at the constant rate (step S120). The rate is designated by the seesaw switch 16 when the switch SW1 is turned on.

The zooming continues at the constant rate (steps S120–S126) until the zoom end is detected (step S124) or until the switch SW1 or the seesaw switch 16 is operated again (step S126).

If the zoom end is detected (step S124) or the switch SW1 or the seesaw switch 16 is operated again (step S126) during the constant rate zooming, the constant rate zooming is cancelled (step S128) and the zooming is completed (step S130). Thereafter, the zooming stops if the zoom end is detected at the step S124, and the processing returns to the step S101 if the switch SW1 or the seesaw switch 16 is operated again at the step S126.

According to the TV lens drive unit which is constructed in the above-mentioned manner, the zoom rate can be kept constant only by pressing the constant rate switch 28 during the operation of the seesaw switch 16. If the seesaw switch 16 is operated again during the constant rate zooming, the constant rate zooming is cancelled so that the operation of the seesaw switch 16 can take priority. Thus, the cameraman can control the zoom as he likes.

Figure 4:
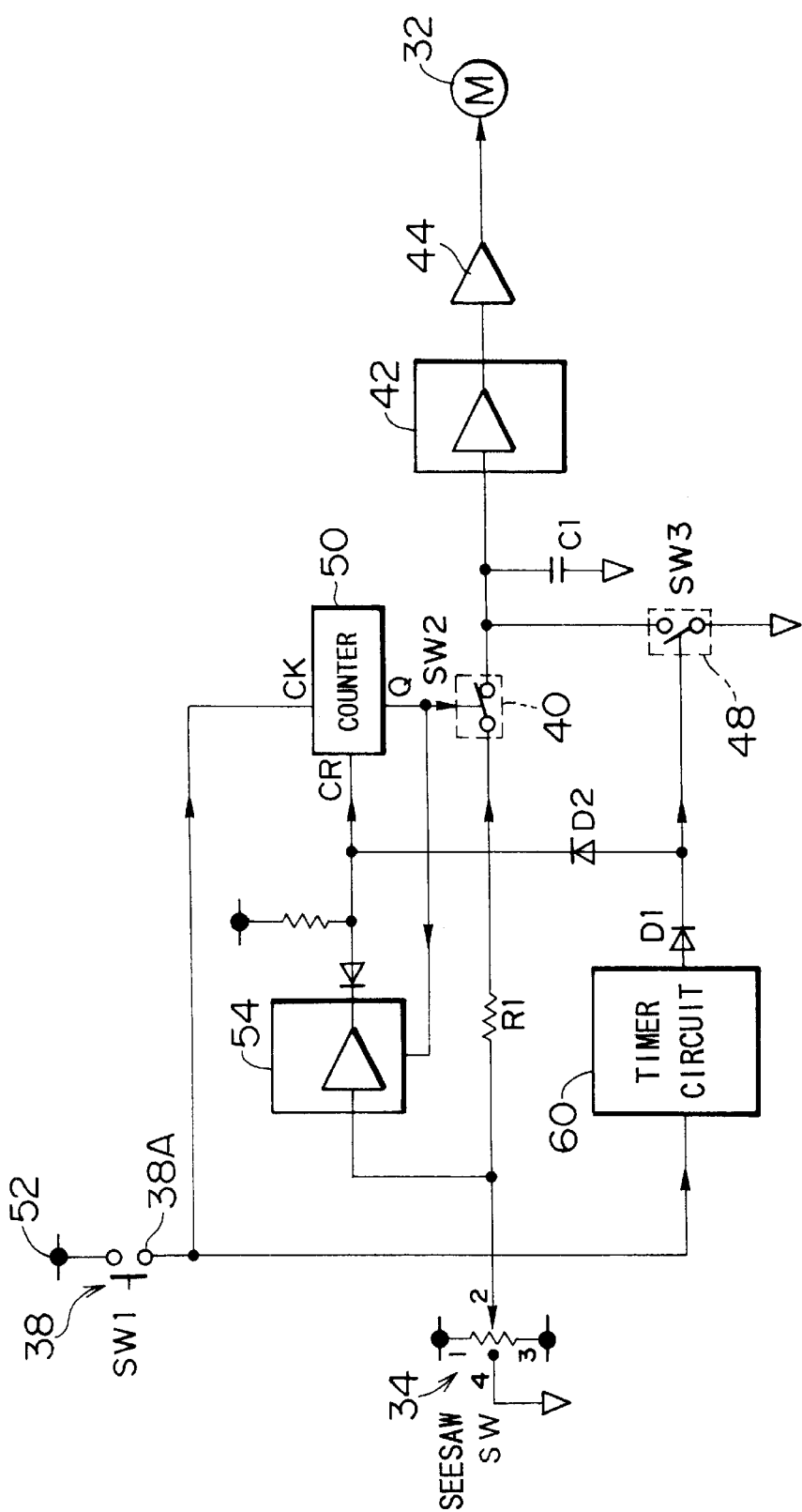
FIG. 4 is a circuit diagram showing another example of the TV lens drive unit.

In this embodiment, the timer circuit 60 may be used instead of the zoom end detection circuit 46 in FIG. 2. In FIG. 4, parts similar to those described with reference to FIG. 2 are denoted by the same reference numerals, and they will not be explained.

In FIG. 4, the terminal 38A of the switch SW1 connects to the input terminal of the timer circuit 60, which counts the time since the switch SW1 is turned on. The time required for the zooming from the telephoto end to the wide end at the minimum zoom rate is set in the timer circuit 60. When the time since the switch SW1 is turned on reaches the set value, the timer circuit 60 outputs a signal to turn on the switch SW3. Thus, the timer circuit 60 functions in substantially the same manner as the zoom end detection circuit 46 described with reference to FIG. 2.

In this case, at the step S124 in the flow chart of FIG. 3, the timer circuit 60 determines whether a preset time has passed or not, instead of detecting the zoom end.

Figure 5:
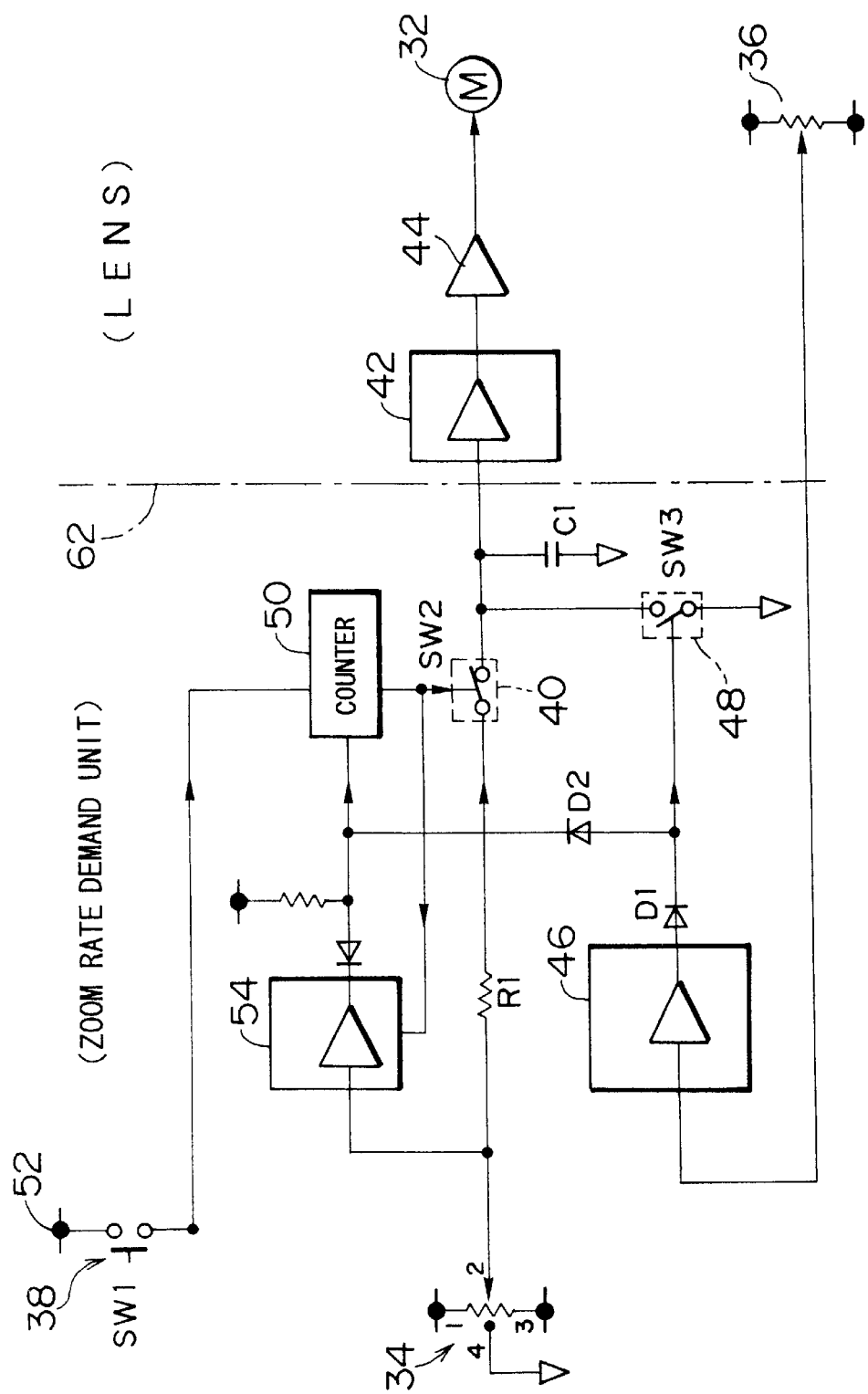
FIG. 5 is a circuit diagram showing an example of the structure when the TV lens drive unit according to the present invention is applied to a zoom rate demand unit.

FIG. 5 shows an example wherein the TV lens drive unit of the present invention is applied to a zoom rate demand unit. Parts similar to those described with reference to FIG. 2 are denoted by the same reference numerals, and they will not be explained. The left side of a borderline 62 indicated by a dot-broken line in FIG. 5 is equivalent to the zoom rate demand unit, and the right side thereof is equivalent to the TV lens. The operational amplifier 42, the power amplifier 44, the zoom drive motor 32 and a zoom position detector (the potentiometer 36) are provided in the TV lens side.

The zoom rate demand unit has a thumb ring as the zoom control means, and reference numeral 34 in FIG. 5 is a potentiometer of the thumb ring. The switch SW1, the zoom end detection circuit 46, the input-output circuit 50, the canceling circuit 54, the condenser C1, etc. are provided in the zoom rate demand unit side, which connects to the TV lens through a cable. The operation of the TV lens drive unit is the same as what was described with reference to FIG. 2, and thus, it will not be explained.

As shown in FIG. 6 the timer circuit 60 may be used instead of the zoom end detection circuit 46 in FIG. 5. In FIG. 6, parts similar to those described with reference to FIG. 5 are denoted by the same reference numerals, and they will not be explained. The operation of the structure in FIG. 6 is the same as in the embodiment described with reference to FIG. 4. The structure in FIG. 6 does not require the potentiometer for detecting the zoom position.

A description will be given of the second embodiment of the present invention.

Figure 7:
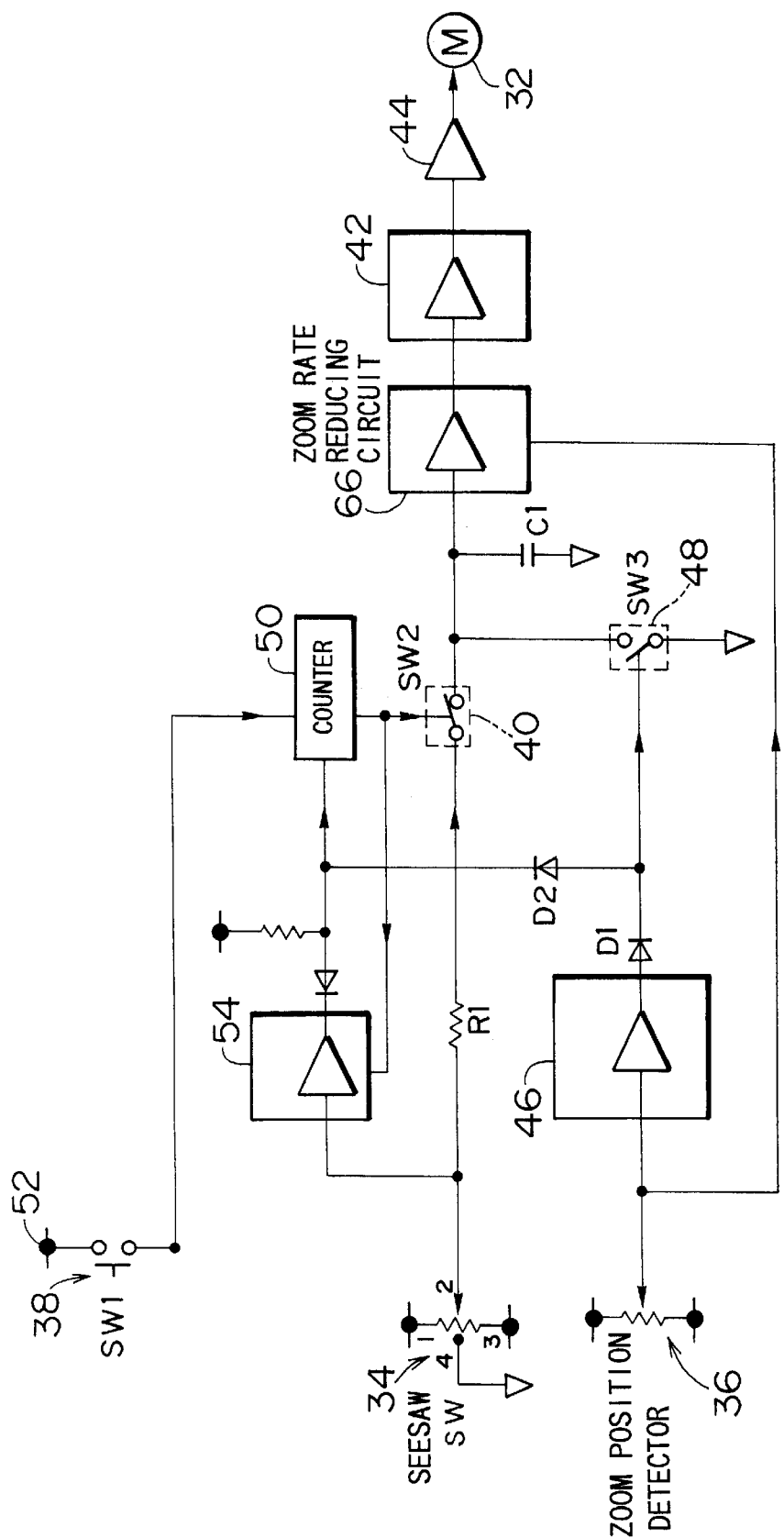
FIG. 7 is a view showing the structure of the TV lens drive unit according to the second embodiment of the present invention.

FIG. 7 shows the structure of a TV lens drive unit according to the second embodiment of the present invention. In FIG. 7, parts similar to those described with reference to FIG. 2 are denoted by the same reference numerals, and they will not be explained.

In the TV lens drive unit, a zoom rate reducing circuit 66 is provided at the front of the operational amplifier 42, and the output of the potentiometer 36 for detecting the zoom position is transmitted to the zoom rate reducing circuit 66.

The zoom rate reducing circuit 66, which is simplified in FIG. 7, detects whether the current zoom position is close to the zoom end or not in accordance with the signal from the potentiometer 36 for detecting the zoom position. The zoom rate reducing circuit 66 outputs a signal to the operational amplifier 42 in such a way as to smoothly reduce the zoom rate in proximity to the zoom end so that the zoom lens can stop at the zoom end. The criteria in deciding whether the zoom position is close to the zoom end or not, a time constant for reduction, and so forth are set appropriately.

The zoom rate is reduced automatically in proximity to the telephoto end or the wide end, thus preventing the sudden stop at the zoom end.

Figure 8:
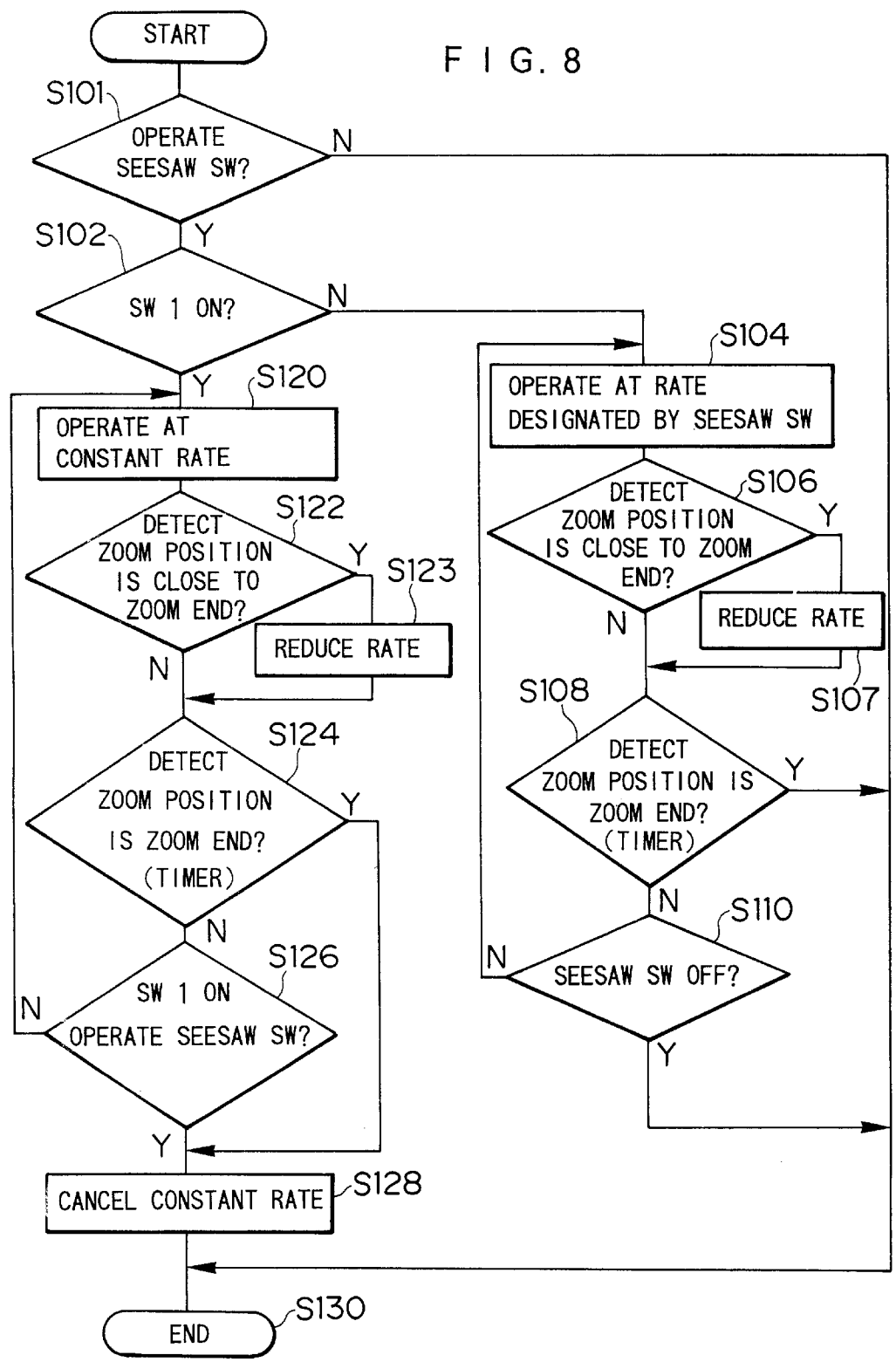
FIG. 8 is a flow chart showing the flow of the zooming performed by the TV lens drive unit in FIG. 7.

FIG. 8 shows the flow of the zooming performed by the TV lens drive unit in FIG. 7. In the flow chart of FIG. 8, the process of detecting whether the zoom position is close to the zoom end or not (step S106) and the process of reducing the zoom rate (step S107) are added between the step S104 and the step S108 in the flow chart of FIG. 3, and the process of detecting whether the zooming position is close to the zoom end or not (step S122) and the process of reducing the zoom rate (step S123) are added between the step S120 and the step S124. In FIG. 8, the same processes as those in the flow chart of FIG. 3 are denoted by the same reference numerals, and they will not be explained.

If the zoom rate reducing circuit 66 detects that the zooming position is close to the zoom end (step S106) during the zooming in accordance with the command from the seesaw switch 16 at the step S104, the zoom rate reducing circuit 66 reduces the zoom rate in accordance with a preset reducing function (step S107). If the zoom position is not close to the zoom end at the step S106, the zoom control continues in accordance with the command from the seesaw switch 16 (steps S108, S110).

If the switch SW1 is operated during the operation of the seesaw switch 16 (steps S101, S102) and the zoom rate reducing circuit 66 detects that the zoom position is close to the zoom end during the constant rate zooming (step S122), the zoom rate reducing circuit 66 reduces the zoom rate in accordance with a preset reducing function (step S123). If the zoom position is not close to the zoom end at the step S122, the constant rate zooming at the step S120 continues (steps S124, S126).

Consequently, the zoom rate is reduced smoothly when the lens gets close to the telephoto end and the wide end, so that the lens can stop at the telephoto end and the wide end. It is particularly advantageous if the zooming is performed at a high rate.

A description will be given of the third embodiment of the present invention.

Figure 9:
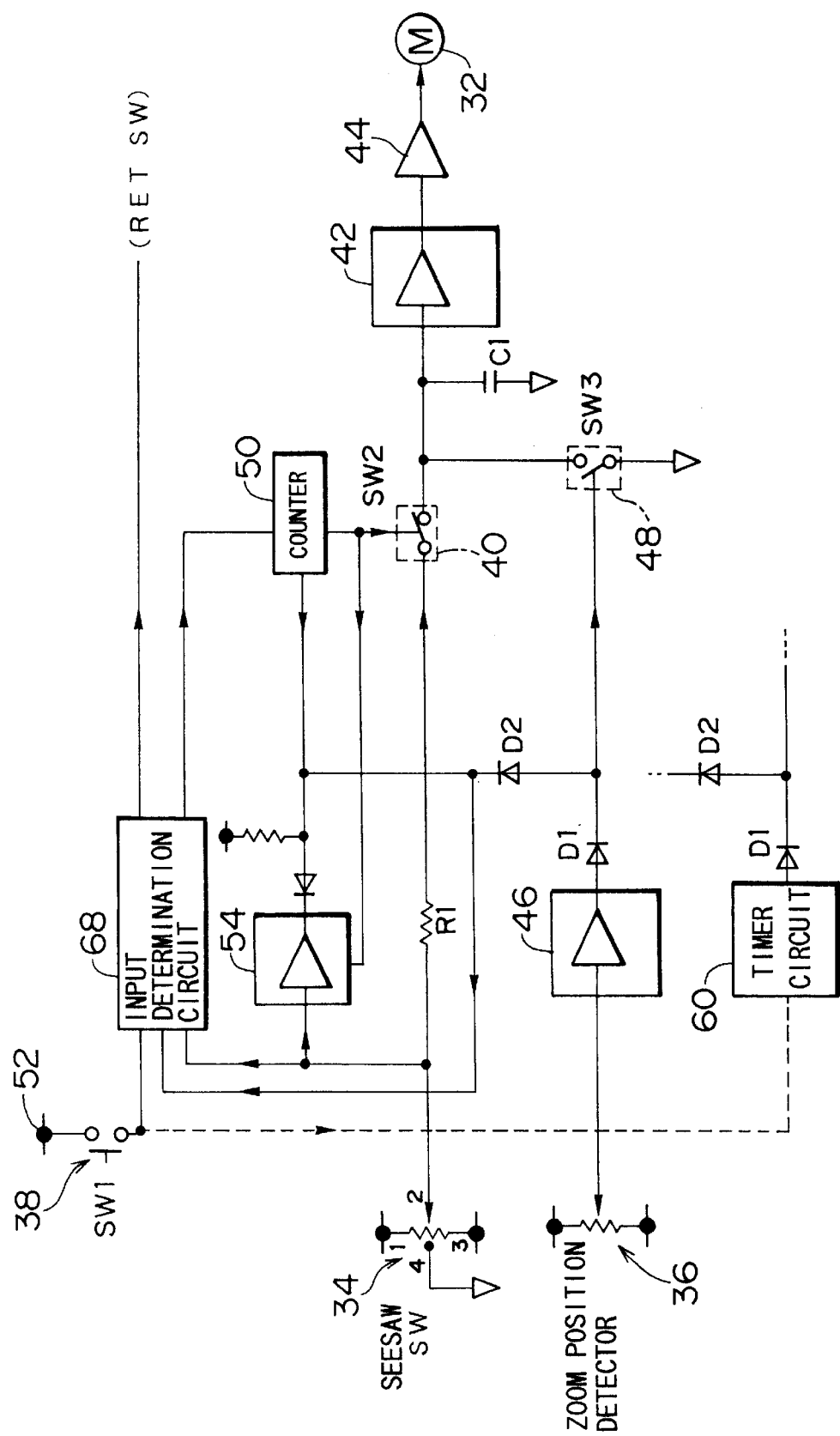
FIG. 9 is a view showing the structure of the TV lens drive unit according to the third embodiment of the present invention.

FIG. 9 shows the structure of a TV lens drive unit according to the third embodiment of the present invention. Parts similar to those described with reference to FIG. 2 are denoted by the same reference numerals, and they will not be explained.

The TV lens drive unit uses the switch SW1 as the return switch (RET SW) 22, and there is no necessity for providing the constant rate switch 28 in FIG. 1 in view of the appearance of the apparatus. In this embodiment, the return switch 22 is provided with the function of the constant rate switch. It is also possible to provide another switch with the function of the constant rate switch.

The return switch 22 is operated to project an image, which is captured by another cameraman (e.g., an image on air), on the viewfinder of the TV camera. The return switch 22 is operated appropriately to confirm the image.

As shown in FIG. 9, an input determination circuit 68 is provided behind the switch SW1, and the input determination circuit 68 switches the functions relating to whether the switch SW1 is used as the return switch or the constant rate switch for the constant rate zooming.

The input determination circuit 68 receives an output voltage of the potentiometer 34 in the seesaw switch 16, and receives a detection signal from the zoom end detection circuit 46. Only when the seesaw switch 16 is operated, the input determination circuit 68 transmits a control signal from the SW1 to the input-output circuit 50. If the seesaw switch 16 is not operated, the input determination circuit 68 changes the connection paths for the switch SW1 so that the control signal from the switch SW1 can transmit to a return input terminal of a camera circuit (not illustrated).

Accordingly, the switch SW1 functions as the return switch when the seesaw switch 16 is not operated, and it functions as the constant rate switch for the constant rate zooming only when the seesaw switch 16 is operated. The constant rate zooming is cancelled by detecting the zoom end or operating the seesaw switch 16 again.

As stated above, the constant rate switch, which is operated to keep the zoom rate constant, is also used as another switch such as the existing return switch, and therefore, it is not necessary to provide a special switch means as the constant rate switch.

As is the case with the embodiment described with reference to FIG. 4, the timer circuit 60 may be used instead of the zoom end detecting circuit 46 in FIG. 9.

As set forth hereinabove, according to the TV lens drive unit of the present invention, the switch means is operated during the operation of the zoom control means to thereby store the zoom direction and rate and maintain the zoom rate. The zooming is performed at the zoom rate when the switch means is operated. It is therefore easy to keep the zoom rate constant. It is particularly advantageous when the cameraman shoots with the TV camera such as the ENG camera on the shoulder.

Moreover, since it is easy to keep the zoom rate constant according to the present invention, the cameraman can concentrate his attention on the confirmation of the composition and the circumstantial judgement without being troubled by the zooming operation. This provides more safety for the cameraman while he is moving.

Furthermore, the present invention provides the function of reducing the zoom rate in proximity to the telephoto end or the wide end, so that the lens can stop naturally at the telephoto end or the wide end.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens drive unit which moves a variable frame lens group of a TV lens with a motor to thereby adjust a zoom, said TV lens drive unit comprising:

zoom control means for designating a telephoto/wide zoom direction and a zoom rate;

switch means for designating a constant zoom rate;

storage means for storing the zoom direction and the zoom rate, designated by the zoom control means when said switch means is operated, in response to the operation of said switch means during the operation of said zoom control means; and motor control means for invalidating the zoom direction and the zoom rate designated by the zoom control means in response to the operation of said switch means during the operation of said zoom control means, and running said motor so that said zoom rate can be constant in accordance with the designation of the zoom direction and the zoom rate stored in said storage means.

2. The TV lens drive unit as defined in claim 1, further comprising:

detection means which detects when a zoom position gets close to one of a telephoto end and a wide end; and reduction means for reducing the zoom rate in proximity to said one of the telephoto end and the wide end in accordance with the detection of said detection means.

3. The TV lens drive unit as defined in claim 1, wherein a control member of said switch means also serves as a control member of switch means relating to another function.

4. The TV lens drive unit as defined in claim 3, wherein said another function is a return switch function.

5. A TV lens drive unit which moves a variable frame lens group of a TV lens with a motor to thereby adjust a zoom, said TV lens drive unit comprising:

a zoom control mechanism operable by a user to designate a telephoto/wide zoom direction and a zoom rate;

a constant zoom rate designating switch operable by a user to designate a constant zoom rate;

a storage element storing the zoom direction and the zoom rate designated by the zoom control mechanism when said constant zoom rate designating switch is operated in response to the operation of said constant zoom rate designating switch during the operation of said zoom control mechanism; and a motor control mechanism for invalidating the zoom direction and the zoom rate designated by the zoom control mechanism in response to the operation of said constant zoom rate designating switch during the operation of said zoom control mechanism, and running said motor so that said zoom rate can be constant in accordance with the designation of the zoom direction and the zoom rate stored in said storage element.

6. The TV lens drive unit as defined in claim 5, further comprising:

a zoom position detector detecting when a zoom position of a said TV lens gets close to one of a telephoto end and a wide end; and a zoom rate reduction mechanism reducing the zoom rate in proximity to said one of the telephoto end and the wide end in accordance with a result of zoom position detection by said zoom position detector.

7. The TV lens drive unit as defined in claim 5, wherein the constant zoom rate designated in accordance with said constant zoom rate designating switch is cancelled by subsequent operation of said zoom control mechanism.

8. The TV lens drive unit as defined in claim 5, wherein said constant zoom rate designating switch also serves as a switch for another function.

9. The TV lens drive unit as defined in claim 8, wherein said another function is a return switch function.

* * * * *